Jan. 13, 1959  S. R. BEYETTE  2,868,142
ICE CREAM FRUIT INJECTOR
Filed Dec. 17, 1957  4 Sheets-Sheet 1

INVENTOR.
SANFORD R. BEYETTE
BY
McMorrow, Berman & Davidson
ATTORNEYS

Jan. 13, 1959 S. R. BEYETTE 2,868,142
ICE CREAM FRUIT INJECTOR
Filed Dec. 17, 1957 4 Sheets-Sheet 3

INVENTOR.
SANFORD R. BEYETTE
BY
McMorrow, Berman & Davidson
ATTORNEYS

Jan. 13, 1959  S. R. BEYETTE  2,868,142
ICE CREAM FRUIT INJECTOR
Filed Dec. 17, 1957  4 Sheets-Sheet 4
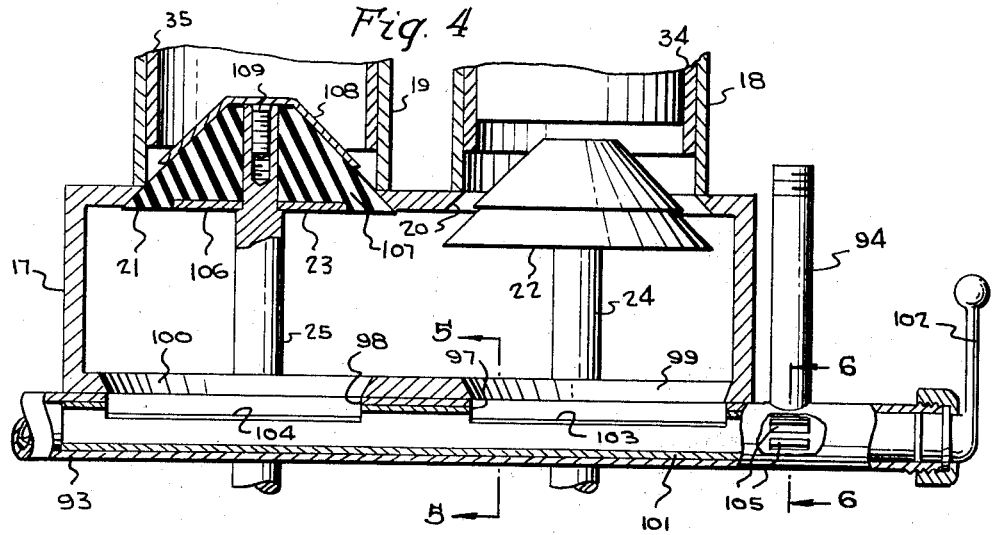
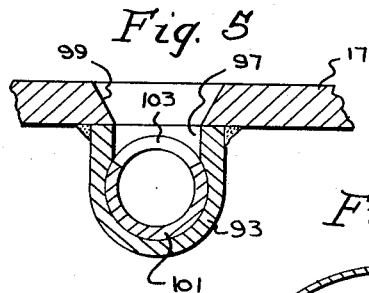
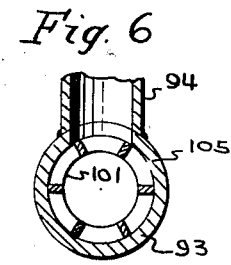
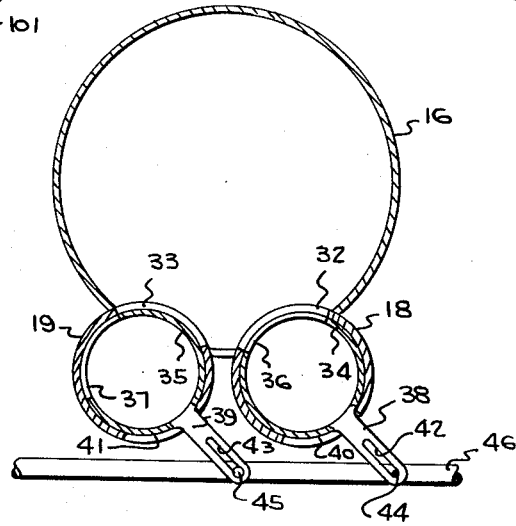
INVENTOR.
SANFORD R. BEYETTE
BY
McMorrow, Berman + Davidson
ATTORNEYS United States Patent Office 2,868,142
Patented Jan. 13, 1959

2,868,142

ICE CREAM FRUIT INJECTOR

Sanford R. Beyette, St. Regis Falls, N. Y., assignor to Gordon D. Beyette, West Haven, Conn.

Application December 17, 1957, Serial No. 703,318

10 Claims. (Cl. 107—1)

This invention relates to apparatus for manufacturing ice cream, and more particularly to an apparatus for injecting fruit, nuts, or similar food material into ice cream.

The main object of the invention is to provide a novel and improved apparatus for injecting food material into ice cream, said apparatus being relatively simple in construction, being easy to operate, and being arranged so that fruit, nuts, or similar food material may be injected into ice cream discharged directly from an ice cream freezer.

A further object of the invention is to provide an improved apparatus for injecting food materials into ice cream, said apparatus involving relatively inexpensive components, being durable in construction, being reliable in operation, and being relatively compact in size.

A still further object of the invention is to provide an improved apparatus for injecting food materials, such as fruit, nuts, or the like, into ice cream from an ice cream freezer, the apparatus being arranged so that it can likewise be used for making "Royal" ice cream of various kinds wherein syrup or other flavoring material is mixed into the ice cream as it leaves the freezer, the apparatus being arranged so that the injected material is distributed uniformly through the ice cream, whereby the appearance of the ice cream is enhanced, and whereby the flavor thereof is improved.

Further objects and advantages of the invention will become apparent from the following description and claims, and from the the accompanying drawings, wherein:

Figure 4 is an enlarged vertical cross sectional view taken on the line 4—4 of Figure 2.

Figure 5 is an enlarged cross sectional detail view taken on the line 5—5 of Figure 4.

Figure 6 is an enlarged cross sectional detail view taken on the line 6—6 of Figure 4.

Figure 7 is a horizontal cross sectional view taken on the line 7—7 of Figure 1.

Figure 1:
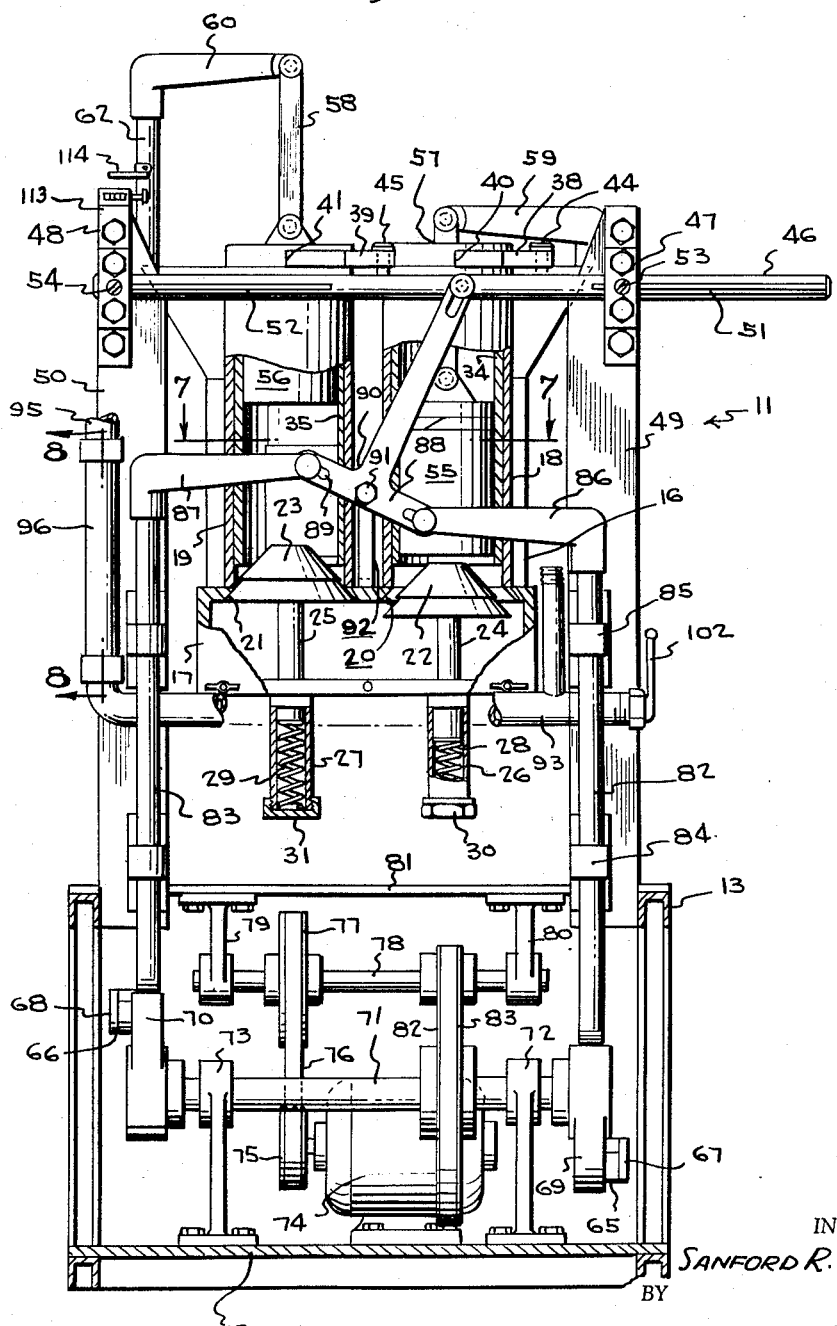
Figure 1 is a front elevational view, with parts broken away, showing an apparatus for injecting food materials into ice cream, in accordance with the present invention.

Referring to the drawings, 11 generally designates an improved apparatus for injecting food materials, such as fruit, nuts, syrup, or the like, into ice cream, in accordance with the present invention. The apparatus 11 comprises a supporting frame including a base plate 12 and a generally rectangular lower framework 13 in the bottom portion of which said base plate 12 is secured, defining a generally rectangular housing or enclosure. The framework also includes the upper generally rectangular frame portion 14 having a horizontal top wall 15 on which is mounted a large, vertical, generally cylindrical hopper 16 adapted to receive the fruit, nuts, or similar food material to be injected into the ice cream.

Figure 2:
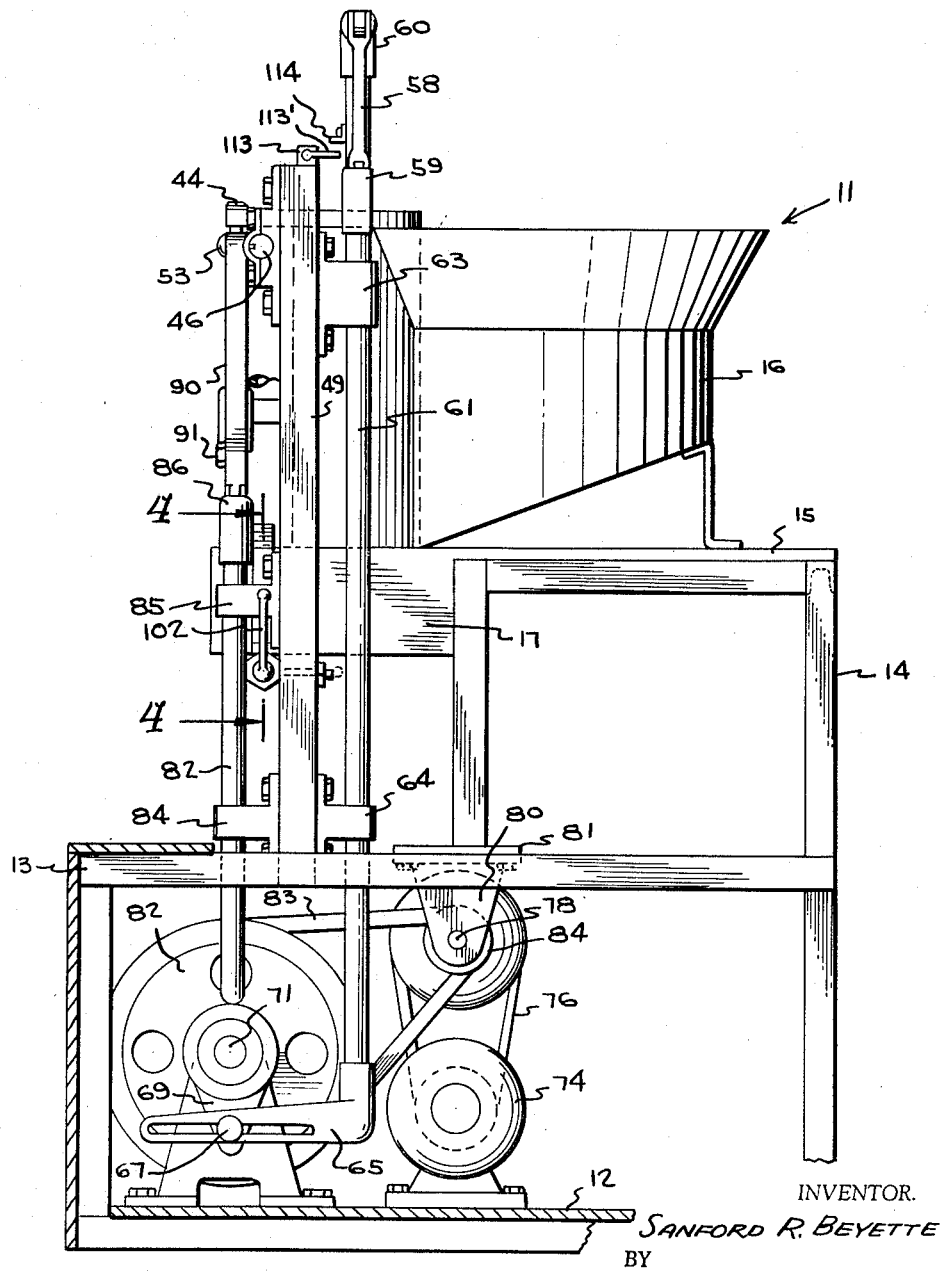
Figure 2 is a side elevational view, partly in vertical cross section, of the apparatus of Figure 1.

Designated at 17 is a generally rectangular injection chamber which is secured to the upper forward portion of the frame structure 14 subjacent to one side of the hopper 16, as shown in Figure 2. Rigidly secured on the top wall of the chamber 17 are a pair of vertical cylinders 18 and 19 communicating with the chamber 17 at their bottom ends through respective conical openings 20 and 21, as shown in Figure 1.

Designated respectively at 22 and 23 are respective conical valve members mounted on vertical shafts 24 and 25 which are slidably received in respective depending cylinders 26 and 27 secured to the bottom wall of the chamber 17, said cylinders containing the respective coiled biasing springs 28 and 29 acting between the bottom caps 30, 31 of the cylinders 26 and 27 and the bottom ends of the valve rods 24 and 25, to bias the valve members 22 and 23 upwardly against the conical openings 20 and 21.

Figure 3:
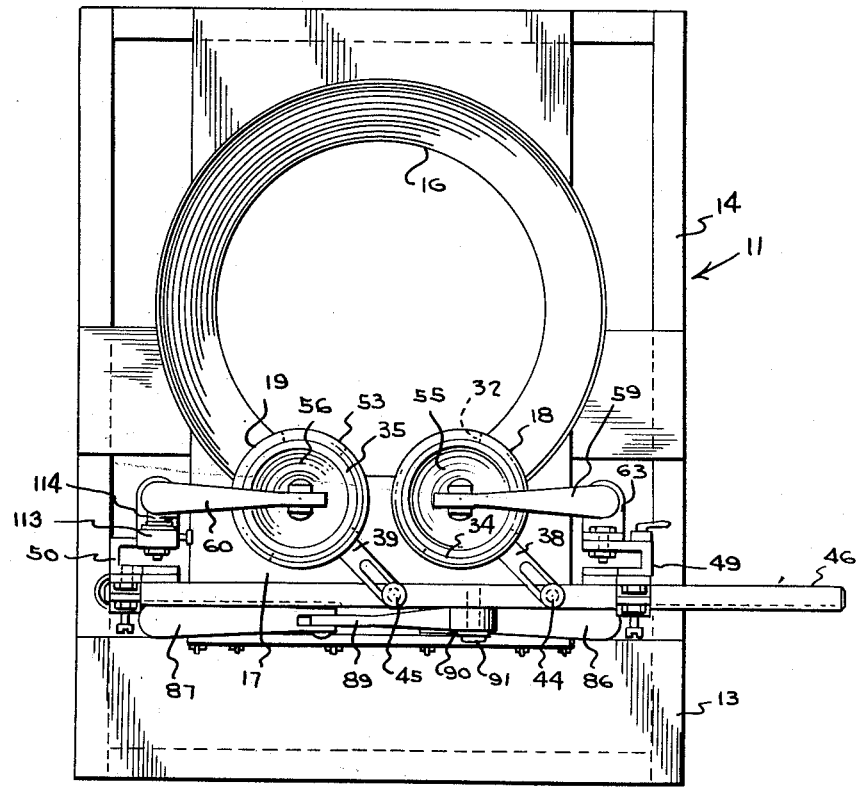
Figure 3 is a top plan view of the apparatus illustrated in Figures 1 and 2.
Figure 8:
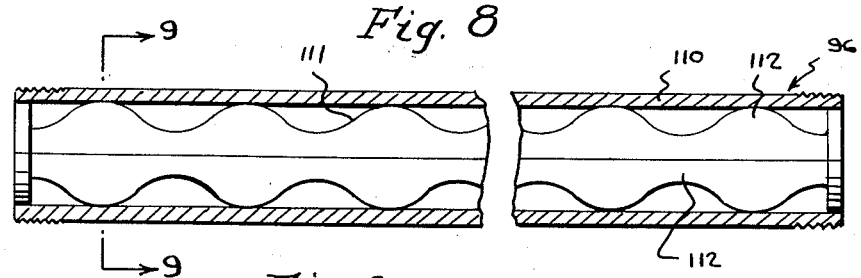
Figure 8 is an enlarged cross sectional view taken substantially on the line 8—8, and showing the details of the inner structure of the mixing conduit employed at the outlet of the apparatus of Figures 1 to 7.

The wall portions of the cylinders 18 and 19 located within the hopper 16 are formed with respective rectangular apertures 32 and 33 (Figure 3). Rotatably mounted in the respective cylinders 18 and 19 are respective apertured valve sleeves 34 and 35, said sleeves having respective rectangular apertures 36 and 37 (Figure 7) which are at times registrable with the rectangular apertures 32 and 33.

Secured to the respective sleeves 34 and 35 are the respective outwardly projecting operating arms 38 and 39, said arms extending through the respective horizontal slots 40 and 41 formed in the cylinders 18 and 19. Arms 38 and 39 are formed at their outer end portions with respective slots 42 and 43 in which are respectively engaged the pins 44 and 45 carried on a horizontal drive rod 46 which is slidably mounted for horizontal reciprocation in respective supporting brackets 47 and 48 mounted on vertical supporting bars 49 and 50 secured to the upper forward portion of the frame 13 at the respective opposite sides thereof.

As shown in Figure 1, the horizontal drive bar 46 is formed with respective keyways 51 and 52 in which are engaged the inner ends of respective guide screws 53 and 54 threadedly engaged through the outer portions of the brackets 47 and 48, whereby the drive rod 46 is held against rotation while being free to reciprocate horizontally in the bearing supports 47 and 48.

As shown in Figure 7, the apertures 36 and 37 are differentially located in the sleeve members 34 and 35 and are arranged so that the aperture 37 is completely out of registry with respect to the aperture 33 when the aperture 36 completely registers with the aperture 32, as illustrated, with the drive shaft 46 in the position thereof shown in Figures 1 and 7, and with the arms 38 and 39 rotated to their maximum counterclockwise position, as viewed in Figure 7. When the drive shaft 46 is moved to the left from the position of Figure 7, the arms 38 and 39 are rotated clockwise, whereby aperture 37 is moved into registry with the aperture 33 and whereby aperture 36 moves out of registration relative to aperture 32. Thus, the lower portions of the cylinders 18 and 19 are alternately opened with respect to the hopper 16, whereby food material may be alternately admitted into the lower portions of said cylinders responsive to the reciprocation of the horizontal drive rod 46. Slidably and sealingly mounted in the respective sleeves 34 and 35 are the respective pistons 55 and 56, the top ends of the pistons 55 and 56 being connected by respective link bars 57 and 58 to respective arms 59 and 60 secured to the top ends of respective vertical follower rods 61 and 62 slidably mounted for vertical reciprocation in respective pairs of bearing brackets 63 and 64 secured to the rear surfaces of the vertical bar members 49 and 50. The vertical transmission rods 61 and 62 have rigidly secured to their lower ends respective horizontally extending, slotted arms 65 and 66 which are drivingly engaged by respective crank pins 67 and 68 secured to opposing crank arms 69 and 70 mounted on the opposite ends of a horizontal crank shaft 71 journaled in a pair of upstanding bearing brackets 72, 73 secured to the base plate 12, as shown in Figure 1. Mounted on said base plate is an electric motor 74 having an output pulley 75 which is coupled by a belt 76 to a transmission pulley 77 mounted on a counter-shaft 78 journaled in depending brackets 79, 80 secured to and depending from the top transverse plate member 81 of the framework 13, as is clearly shown in Figures 1 and 2.

The crank shaft 71 has a relatively large pulley 82 mounted thereon which is coupled by a belt 83 to a relatively small drive pulley 84 mounted on the counter-shaft 78, whereby the crank shaft 71 is drivingly coupled to the motor 74 and is driven thereby at a substantially reduced rate of speed, as compared with the speed of the motor output shaft. As will be readily apparent, the opposing crank arms 69 and 70 reciprocate the transmission rods 61 and 62 in alternating sequence, namely, with a phase difference of 180°, whereby the piston 56 rises to its uppermost position in the sleeve 35 when the piston 55 descends to its lowermost position in the sleeve 34, and vice versa. The crank arms 69 and 70 are arranged such that the sleeve aperture 37 moves into complete registration with the cylinder aperture 33 when the piston 56 rises to its uppermost position in the sleeve 35, whereas the sleeve aperture 36 of sleeve 34 is completely out of registry with respect to the cylinder aperture 32 when the piston 55 reaches its lowermost position in the sleeve 34. Thus, when the lower portion of cylinder 19 is opened to the hopper 16 the piston 56 is rising, producing suction in the lower portion of sleeve 35, whereas at this time the piston 55 produces compression in the lower portion of sleeve 34, forcing the material previously admitted into the sleeve downwardly into the injection chamber 17 past the valve member 22, which valve member is depressed by the pressure developed by the downwardly moving piston 55 against the food material. Thus, the valves 22 and 23 alternately open, as their associated pistons 55 and 56 travel downwardly in the sleeves 34 and 35, whereby food material, such as nuts, fruit, or the like, from the hopper 16 is alternately discharged into the injection chamber 16 by the action of the pistons 55 and 56, and by the action of their associated valve sleeves 34 and 35.

Respective follower rods 82 and 83 are slidably mounted in respective pairs of bearing brackets 84, 85 secured to the forward surfaces of the vertical follower members 49 and 50, the lower ends of the rods 82 and 83 camingly engaging on the crank members 69 and 70, whereby the rods 82 and 83 are alternately reciprocated in 180° phase relationship. The follower rods 82 and 83 are provided with the respective horizontal top arms 86 and 87 which are rigidly secured to the top ends of the rods 82 and 83 and which project inwardly towards each other. The inner ends of the arms 86 and 87 are pivotally and slidably connected to the respective opposing arm portions 88 and 89 of a lever member 90 pivoted at 91 to an upstanding support bar 92 rigidly secured to the top wall of the injection chamber 17 between the cylinders 18 and 19, shown in Figure 1. The lever 90 has the intermediate upstanding arm portion which is slidably and pivotally connected at its top end to the intermediate portion of the horizontal drive rod 46, whereby said drive rod is drivingly coupled to the respective follower arms 86 and 87, and whereby the rod 46 is driven simultaneously with the vertical reciprocation of the follower rods 82 and 83. Since the pistons 55 and 56 are likewise driven by the cam shaft 71, the action of the valve sleeves 34 and 35 is positively and accurately timed with respect to the reciprocation of the pistons 55 and 56, to provide the opening of the sleeve valve members simultaneously with the approach of the piston members to their uppermost positions in their sleeves, and vice versa, as above explained.

Designated at 93 is a horizontally extending ice cream conduit having the inlet conduit portion 94 extending at right angles thereto adjacent the right end of the conduit 93, as viewed in Figure 4, and communicating with the discharge conduit 95 at its left end, through a mixing chamber 96, presently to be described. The ice cream conduit 93 is formed with respective openings 97 and 98 registering with corresponding openings 99 and 100 in the bottom wall of the injection chamber 17. As shown in Figure 4, the openings 99 and 100 are located respectively beneath the check valve members 22 and 23. Rotatably mounted in the ice cream conduit 93 is a valve sleeve 101 which is provided at its right end, as viewed in Figure 4, with an external operating handle 102. The sleeve 101 is formed with respective valve openings 103 and 104 which are registrable with the fixed openings 97 and 98 of the conduit in one position of handle 102. The handle 102 may be rotated to another position, for example, the position shown in dotted view in Figure 2 at right angles to the first-named position of the handle, whereby the apertures 103 and 104 are moved out of registry with respect to the apertures 97 and 98, to seal off the ice cream conduit with respect to the injection chamber 17.

The sleeve member 101 is formed adjacent the ice cream inlet conduit elements 94 with the apertures 105 which are distributed around the entire periphery of the sleeve member at this point to allow free passage of ice cream from the conduit member 94 into the main body of the ice cream conduit 93 and into the sleeve member 101 in all positions of the control handle 102. Thus, when the handle 102 is in its upstanding position, shown in full line view in Figures 1, 2 and 4, ice cream will be admitted through the inlet conduit element 94 into the sleeve 101 and food material will be injected thereinto from the injection chamber 17 through the registering pairs of apertures 99, 97, 103 and 100, 98 and 104, the food material being injected under substantial pressure, developed by the pistons 55 and 56, and being forced into the ice cream moving through the conduit 93. When it is desired to discontinue the injection of the food material into the ice cream, the control handle 102 is rotated to the dotted view position thereof shown in Figure 2, whereby the ice cream travels through the conduit 93 without receiving any of the food material.

As shown in Figure 4, each of the check valve members 22 and 23 comprises a lower circular rigid disc element 106 supported on a shoulder provided on its associated rod 24 or 25, and a conical body 107 of resilient deformable material, such as rubber or the like engaged on the top portion of the rod and supported on the rigid disc 106. A conical cap 108 is secured on the top end of the rod, said cap being provided with a depending threaded central stud element 109 which threadedly engages in a tapped bore provided in the top portion of the associated rod 24, 25, whereby the cap member 108 may be tightened to clamp the resilient deformable valve body 107 to the top end of the rod. As shown in Figure 4, the peripheral portion of the valve body 107 extends beyond the edges of the clamping members 106 and 108 and is sealingly engageable in the associated conical aperture or seat, for example, the conical apertures 20 and 21 in the top wall of the injection chamber 17.

Figure 9:
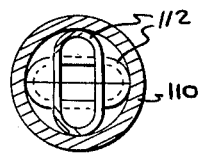
Figure 9 is a transverse cross sectional view taken through the mixing conduit, said view being taken on the line 9—9 of Figure 8.

The mixing chamber 96 which is connected to the outlet end of the ice cream conduit 93 comprises an elongated outer tube 110 connected at one end to the outlet portion of the ice cream conduit 93 and connected at its other end to the discharge conduit 95. The tube 110 contains an inner conduit 111 which comprises a plurality of successive flattened sections 112 which are constricted in width, as shown in Figure 9, the planes of the successive flattened sections being perpendicular to each other, whereby the material forced therethrough is successively squeezed and expanded horizontally and vertically, providing a kneading action on the material and serving to uniformly distribute the fruit, nuts or other food material through the ice cream.

As will be readily apparent, various types of food material may be mixed in the ice cream, including syrups, powdered material, or the like, whereby different types of ice cream mixtures may be obtained by use of the apparatus.

In operation, the food material, such as fruit, nuts, or the like, to be injected into the ice cream is placed in the hopper 16 and the mixing control handle 102 is moved to its open position, namely the position wherein the sleeve apertures 103 and 104 register with the apertures 99, 97 and 100, 98, as shown in Figure 4. With the motor 74 energized, the pistons 55 and 56 alternatively reciprocate in the sleeves 34 and 35, and said sleeves alternately rotate to open and close their associated valve apertures. Food material is forced by suction into the lower portions of the sleeve members when their associated pistons rise, as above explained, and is forced downwardly upon the downward strokes of the pistons, past the check valves 22 and 23 and into the injection chamber 17, wherein substantial pressure is developed. This pressure forces the food material into the ice cream as it travels through the conduit 93, the material being further distributed through the ice cream by the action of the mixing chamber 96, as above described. The resultant product contains ice cream in which food material, such as fruits, nuts, or the like, is distributed substantially in a uniform and homogeneous manner through the ice cream.

Designated at 113 is a counter of generally conventional construction, the counter having an actuating arm 113' which projects rearwardly and which is intermittently engageable by a projection 114 secured to the top portion of the transmission rod 62. Thus, each stroke of the transmission rod 62 actuates the counter 112', whereby the amount of food material injected will be indicated from the reading of the counter 112'.

While a specific embodiment of an improved apparatus for injecting food materials into ice cream has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an apparatus for injecting food materials into ice cream, an ice cream conduit, an injection chamber communicating with said conduit, a cylinder on said injection chamber in communication therewith, a yieldable check valve between said cylinder and said injection chamber, a piston in said cylinder, a hopper for food materials adjacent said cylinder, an apertured sleeve valve in said cylinder, said cylinder having an apertured wall portion exposed to said hopper, said sleeve valve being rotatable so that its aperture registers with the aperture in said wall portion, means to simultaneously rotate said sleeve valve to registering position with said wall portion aperture and to elevate said piston in said cylinder, and means to simultaneously rotate said sleeve valve to closed position and lower said piston, whereby to force food material past said check valve into said injection chamber.

2. In an apparatus for injecting food material into ice cream, a support, an ice cream conduit secured to said support, an injection chamber mounted on said support and communicating with said conduit, a vertical cylinder mounted on the top wall of said chamber and communicating therewith, a downwardly yieldable check valve mounted in said chamber and engaging in the bottom end of said cylinder, a hopper for food materials adjacent said cylinder, conduit means communicatively connecting said hopper to the lower portion of said cylinder, a sleeve member rotatably mounted in said cylinder and being formed with an aperture registrable with said conduit means, a piston slidably mounted in said sleeve member, means to simultaneously rotate said sleeve member to registering position relative to said conduit means and to elevate said piston in said sleeve member, and means to simultaneously rotate said sleeve member to non-registering position with respect to said conduit means and to lower said piston, whereby to force food material downwardly past said check valve into said injection chamber.

3. In an apparatus for injecting food material into ice cream, a support, an ice cream conduit secured to said support, an injection chamber mounted on said support and communicating with said conduit, a vertical cylinder mounted on the top wall of said chamber and communicating therewith, a downwardly yieldable check valve mounted in said chamber and engaging in the bottom end of said cylinder, a hopper for food materials adjacent said cylinder, conduit means communicatively connecting said hopper to the lower portion of said cylinder, a sleeve member rotatably mounted in said cylinder and being formed with an aperture registrable with said conduit means, a piston slidably mounted in said sleeve member, a horizontal rod member slidably mounted on said support, link means connecting said rod member to said sleeve member and being formed and arranged to rotate said sleeve member responsive to movement of said rod member, and means to simultaneously reciprocate said piston and said rod member, said last-named means being formed and arranged to simultaneously rotate said sleeve member to registering position relative to said conduit means and to elevate said piston in said sleeve member, and to simultaneously rotate said sleeve member to a non-registering position with respect to said conduit means and to lower said piston, whereby to force food material downwardly past said check valve into said injection chamber.

4. In an apparatus for injecting food material into ice cream, a support, an ice cream conduit secured to said support, an injection chamber mounted on said support and communicating with said conduit, a pair of side-by-side vertical cylinders mounted on the top wall of said chamber and communicating therewith, respective downwardly yieldable check valves mounted in said chamber and engaging in the bottom ends of said cylinders, a hopper for food materials adjacent said cylinders, said cylinders having apertures in their walls exposed to the interior of the hopper, respective sleeve members in the cylinders, said sleeve members having apertures registrable with the cylinder wall apertures, means coupling the sleeve members together to rotate said sleeve members so that their apertures alternately register with the associated cylinder apertures, respective pistons slidably mounted in the sleeve members, and means simultaneously reciprocating the pistons and rotating the sleeve members, said last-named means being formed and arranged to simultaneously elevate each piston and rotate the aperture of the associated sleeve member substantially into registry with the associated cylinder wall aperture and to simultaneously lower the remaining piston and rotate the remaining sleeve member to non-registering position relative to its associated cylinder wall aperture, whereby to alternately force food materials past the check valves into the injection chamber.

5. In an apparatus for injecting food material into ice cream, a support, an ice cream conduit secured to said support, an injection chamber mounted on said support and communicating with said conduit, a pair of side-by-side vertical cylinders mounted on the top wall of said chamber and communicating therewith, respective downwardly yieldable check valves mounted in said chamber and engaging in the bottom ends of said cylinders, a hopper for food materials adjacent said cylinders, said cylinders having apertures in their walls exposed to the interior of the hopper, respective sleeve members in the cylinders, said sleeve members having apertures registrable with the cylinder wall apertures, a horizontal rod member slidably mounted on said support, respective arms on the sleeve members connected to said rod member and spaced to rotate said sleeve members so that their apertures alternately register with the associated cylinder apertures responsive to reciprocation of said rod member, respective pistons slidably mounted in the sleeve members, and means simultaneously reciprocating the pistons and rod member, said last-named means being formed and arranged to simultaneously elevate each piston and rotate the aperture of the associated sleeve member substantially into registry with the associated cylinder wall aperture and to simultaneously lower the remaining piston and rotate the remaining sleeve member to non-registering position relative to its associated cylinder wall aperture, whereby to alternately force food material past the check valves into the injection chamber.

6. In an apparatus for injecting food material into ice cream, a support, an ice cream conduit secured to said support, an injection chamber mounted on said support and communicating with said conduit, a pair of side-by-side vertical cylinders mounted on the top wall of said chamber and communicating therewith, respective downwardly yieldable check valves mounted in said chamber and engaging in the bottom ends of said cylinders, a hopper for food materials adjacent said cylinders, said cylinders having apertures in their walls exposed to the interior of the hopper, respective sleeve members in the cylinders, said sleeve members having apertures registrable with the cylinder wall apertures, a horizontal rod member slidably mounted on said support, respective arms on the sleeve members connected to said rod member and spaced to rotate said sleeve members so that their apertures alternately register with the associated cylinder apertures responsive to reciprocation of said rod member, respective pistons slidably mounted in the sleeve members, a drive shaft, cam means on the drive shaft, follower means slidably mounted on the support, link means connecting said follower means to said rod member and being formed and arranged to reciprocate said rod member responsive to rotation of said drive shaft, and crank means connecting said drive shaft to said pistons, said crank means and cam means being formed and arranged to simultaneously elevate each piston and rotate the aperture of the associated sleeve member substantially into registry with the associated cylinder wall aperture and to simultaneously lower the remaining piston and rotate the remaining sleeve member ton non-registering position relative to its associated wall aperture, whereby to alternately force food material past the check valves into the injection chamber.

7. In an apparatus for injecting food material into ice cream, a support, an ice cream conduit secured to said support, an injection chamber mounted on said support and communicating with said conduit, a pair of side-by-side vertical cylinders mounted on the top wall of said chamber and communicating therewith, respective downwardly yieldable check valves mounted in said chamber and engaging in the bottom ends of said cylinders, a hopper for food materials adjacent said cylinders, said cylinders having apertures in their walls exposed to the interior of the hopper, respective sleeve members in the cylinders, said sleeve members having apertures registrable with the cylinder wall apertures, a horizontal rod member slidably mounted on said support, respective arms on the sleeve members connected to said rod member and spaced to rotate said sleeve members so that their apertures alternately register with the associated cylinder apertures responsive to reciprocation of said rod member, respective pistons slidably mounted in the sleeve members, a drive shaft, cam means on the drive shaft, follower means slidably mounted on the support, link means connecting said follower means to said rod member and being formed and arranged to reciprocate said rod member responsive to rotation of said drive shaft, crank means connecting said drive shaft to said pistons, said crank means and cam means being formed and arranged to simultaneously elevate each piston and rotate the aperture of the associated sleeve member substantially into registry with the associated cylinder wall aperture and to simultaneously lower the remaining piston and rotate the remaining sleeve member to non-registering position relative to its associated cylinder wall aperture, whereby to alternately force food material past the check valves into the injection chamber, and a mixing conduit connected to said ice cream conduit, said mixing conduit comprising a plurality of successive flattened sections constricted in width, the planes of the successive flattened sections being perpendicular to each other.

8. In an apparatus for injecting food materials into ice cream, an ice cream conduit, an injection chamber communicating with said conduit, a cylinder on said injection chamber in communication therewith, a yieldable check valve between said cylinder and said injection chamber, a piston in said cylinder, a hopper for food materials adjacent said cylinder, valve means in said cylinder communicating with said hopper, means for opennig and closing said valve means, means for elevating and lowering said piston, means synchronizing the opening of the valve means and the elevation of said piston, and means synchronizing the closing of the valve means and the lowering of said piston, whereby to force food material past said check valve into said injection chamber.

9. In an apparatus for injecting food materials into ice cream, an ice cream conduit, an injection chamber communicating with said conduit, a cylinder on said injection chamber in communication therewith, a conical check valve engaging in the portion of said cylinder in communication with said injection chamber, spring means urging said check valve into said cylinder, a piston in said cylinder, a hopper for food materials adjacent said cylinder, valve means in said cylinder communicating with said hopper, means for opening and closing said valve means, means for elevating and lowering said piston, means synchronizing the opening of the valve means and the elevation of said piston, and means synchronizing the closing of the valve means and the lowering of said piston, whereby to force food material past said check valve into said injection chamber.

10. In an apparatus for injecting food materials into ice cream, an ice cream conduit, an injection chamber communicating with said conduit, a cylinder on said injection chamber in communication therewith, a conical check valve mounted in said injection chamber and engaging in the portion of said cylinder in communication with said injection chamber, said check valve having a stem portion extending through a wall of said injection chamber opposite said cylinder, spring means on said wall engaging the end of said stem portion and urging the check valve into said cylinder, a piston in said cylinder, a hopper for food materials adjacent said cylinder, valve means in said cylinder communicating with said hopper, means for opening and closing said valve means, means for elevating and lowering said piston, means synchronizing the opening of the valve means and the elevation of said piston, and means synchronizing the closing of the valve means and the lowering of said piston, whereby to force food material past said check valve into said injection chamber.

References Cited in the file of this patent

UNITED STATES PATENTS

| | | |
|---|---|---|
| 2,032,970 | Bendfelt | Mar. 3, 1936 |
| 2,258,645 | Farrall et al. | Oct. 14, 1941 |
| 2,313,894 | Sanna et al. | Mar. 16, 1943 |
| 2,634,691 | Flockhart | Apr. 14, 1953 |